United States Patent [19]
Rohani et al.

[11] Patent Number: 5,406,585
[45] Date of Patent: Apr. 11, 1995

[54] METHOD AND APPARATUS FOR TRELLIS DECODING IN A MULTIPLE-ACCESS SYSTEM

[75] Inventors: Kamyar Rohani, Fort Worth; Amitava Ghosh, Bedford, both of Tex.

[73] Assignee: Motorola, Inc., Schaumburg, Ill.

[21] Appl. No.: 983,199

[22] Filed: Nov. 30, 1992

[51] Int. Cl.⁶ .............................................. H04L 27/06
[52] U.S. Cl. ......................................... 375/94; 375/99
[58] Field of Search ............. 375/94, 39, 101, 58, 375/99; 371/43; 370/18, 110.1, 110.2, 110.3, 110.4, 111, 74, 19, 20, 21; 455/33.1, 54.1

[56] References Cited
U.S. PATENT DOCUMENTS

| 5,005,188 | 4/1991 | Clark ........................................ 375/94 |
| 5,029,186 | 7/1991 | Maseng et al. ........................ 375/94 |
| 5,103,459 | 4/1992 | Gilhousen et al. .................... 370/18 |
| 5,134,635 | 7/1992 | Hong et al. ........................... 371/43 |
| 5,136,612 | 8/1992 | Bi ........................................... 370/18 |
| 5,140,615 | 8/1992 | Jasper et al. ......................... 375/100 |

Primary Examiner—Stephen Chin
Assistant Examiner—Hai H. Phan
Attorney, Agent, or Firm—Raymond J. Warren

[57] ABSTRACT

A method is provided of discerning a signal of a desired user on a channel having a desired user and a plurality of interfering users, each, upon occasion, transmitting an identifiable, known pilot symbol. The method includes the steps of determining a channel response of the desired user and each of the interfering users and calculating a metric equal to the squared difference between a received signal and a sum of the products of transmitted signals and channel responses for the desired user and each of the plurality of interfering users. The method also includes the step of discerning the signal of the desired user based, at least in part, upon a minimum metric.

14 Claims, 2 Drawing Sheets

— PRIOR ART —

METHOD AND APPARATUS FOR TRELLIS DECODING IN A MULTIPLE-ACCESS SYSTEM

FIELD OF THE INVENTION

The invention relates to communication system and in specific to cellular communication systems.

BACKGROUND OF THE INVENTION

Wireless, radio frequency (rf) receivers are well known. Such receivers are constructed to receive and demodulate information signals modulated onto an rf carrier wave. Modulation methods include such alternatives as frequency shift keying (FSK), quadrature phase shift modulation (QPSK), or quadrature amplitude modulation (QAM).

Within a receiver, the information signal is recovered by mixing the received signal to a zero-rf state and comparing the remaining signal against known standards. In a FSK system 1s and 0s may be detected by the presence or absence of frequency shifts detected at the zero-rf state. In QPSK or QAM systems the received signal is mixed to a zero-rf state and the remaining signal compared to constellations of known symbols. The known symbols are multidimensional, using amplitude and phase as encoding parameters. The use of multidimensional symbols allows QPSK and QAM systems to transmit multiple bits within each symbol, considerably increasing data throughput within such communication systems.

A key element of decoding symbols lies in being able to sense the timing of transmitted symbols. One method of acquiring proper timing in a receiver is provided by transmitting known pilot symbols at regular intervals. The transmission of known pilots not only provides an indication of the start and end of data frames but can also be used to determine a complex channel vector, $\Psi$, operating on the known pilot, P, to produce a received vector, R.

The complex channel vector is calculated by dividing the received vector, R, by the known transmitted pilot vector, P. The quotient is a complex value that may then be used to provide a better estimate of symbols received between pilots by dividing the received symbols by the complex channel vector.

As a further aid to reliability in decoding information, convolutional coding may be used to improve the noise resistance of a communicated signal. A convolutional coder with constraint length $K=3$ and code rate $k/n=\frac{1}{2}$ may be used to encode a signal with a high degree of reliability over a channel with convolutional coding.

Decoding of a channel using convolutional coding is typically based upon maximum likelihood (Viterbi) decoding (see Digital Communications Fundamentals and Applications, by Bernard Sklar, Prentice Hall, 1988, pgs. 315–374). Under Viterbi decoding, state transitions ($t_1 t_n$) of a convolutionally coded signal are plotted in a trellis diagram in a series of possible paths defining a received signal at a time, $t_i$. Under the Viterbi algorithm a metric is calculated defining a measure of similarity, or distance, between a received signal at time $t_i$, and all the trellis paths entering each state at time $t_i$. The metric is then used to eliminate those trellis paths that could not possibly be candidate paths. The best metric path (most likely answer) under the Viterbi algorithm is the path with the lowest cumulative metric.

In general, in a system where $R = \{r_1 \ldots r_L\}$ is a received signal vector, $\Psi$ is a constant channel estimate, $X = \{x_1 \ldots x_L\}$ is a transmitted signal vector, N is a noise vector, and $\sigma_n^2$ is a noise variance, a log-likelihood function of the received vector R, given that X is transmitted, has the form as follows:

$$LR = \ln(p(R|X)) = \sum_{i=1}^{L} -1/(2\sigma_n^2)(|r_i - \psi x_i|^2)$$

Such a function can be used to describe the likelihood of reception of the vector, R, for a binary communications channel with time-varying channel gain and additive white Gaussian noise and zero mean signal level.

While the Viterbi algorithm has worked well, the success of the Viterbi algorithm is based upon a white Gaussian noise source. In slow frequency hopping, code division multiple access (SFH-CDMA) communication systems noise, due to interference, may not be Gaussian where interfering communication units transmit in synchronism. A need exists for a method of extending maximum likelihood decoding to SFH-CDMA systems.

SUMMARY OF THE INVENTION

A method is provided of discerning a signal of a desired user on a channel having a desired user and a plurality of interfering users, each, upon occasion, transmitting an identifiable, known pilot symbol. The method includes the steps of determining a channel response of the desired user and each of the interfering users and calculating a metric equal to the squared difference between a received signal and a sum of the products of transmitted signals and channel responses for the desired user and each of the plurality of interfering users. The method also includes the step of discerning the signal of the desired user based, at least in part, upon a minimum metric.

DETAILED DESCRIPTION OF THE PREFERRED EMBODIMENT

The solution to the problem of providing a method of using maximum likelihood decoding in a SFH-CDMA system lies, conceptually, in determining a channel response for each of a desired user 100 and a number of interfering users 101 and using such channel response to determine a minimum metric. The minimum metric is the squared difference between a received signal and sum of the products of transmitted signals and channel responses.

In a SFH-CDMA system an incoming signal, R, at the receiver is a superposition of the desired signal and the interference signals from the non-desired users. Such a signal may be represented by the equation as follows:

$$R = \left( \psi_1 X^1 + \sum_{i=2}^{M} \psi_i X^i \right) + N$$

where $\Psi_i$ is channel response of the ith user, $X^1$ is a desired transmitted signal, and $X^2$-$X^M$ are interferers. It may be noted that the interferers are not Gaussian noise sources, but they are information bits (or symbols) produced by other users.

The method of using maximum likelihood decoding in a SFH-CDMA system described herein is applicable to a packetized (burst transmission) multiple access system. In such a system packets of data are transmitted at predefined locations within a data frame for a predefined duration where each packet is composed of n information bits (symbols). It is assumed that due to short duration of these packets, the channel characteristics remain constant. Such an assumption can be made with reasonable accuracy in cellular communication channels for packet sizes with duration's shorter than 2 ms.

Such an assumption is supported by results that show, for a subscriber unit moving at 35 mph, fading occurs at a Doppler rate of 30 Hz. With a hopping rate of 500 Hz (2 ms windows) the channel response is relatively constant.

Within each packet of data an embedded pilot vector of size M is transmitted which may be represented as follows:

P=[p1, p2, ... pM]

where the elements of each pilot (P) are the complex vectors from a suitable constellation (e.g., QPSK or QAM). These elements may be transmitted at any time (position) within the transmitted packet where such position is known to the receiver. Pilot vectors are chosen independently for different co-channel transmitters such that each transmitting source can be independently identified (estimated). Such identifiability may be maintained through the selection of orthogonal pilot codes for each co-channel user.

Channel responses, $\Psi_i$, of each transmitting user are determined by cross correlation of known pilots in a received signal at a peak value to produce a channel response value, $\Psi_i$, for each signal ($X^1$-$X^M$). Note that the number of pilot vectors, M, is equal to the number of interfering users plus desired user. This allows a channel vector to be estimated as follows:

$\Psi = [\Psi_1, \Psi_2, \ldots \Psi_M]$ which corresponds to the short term channel characteristics of transmitted signals from the desired as well as interfering users.

Figure 1:
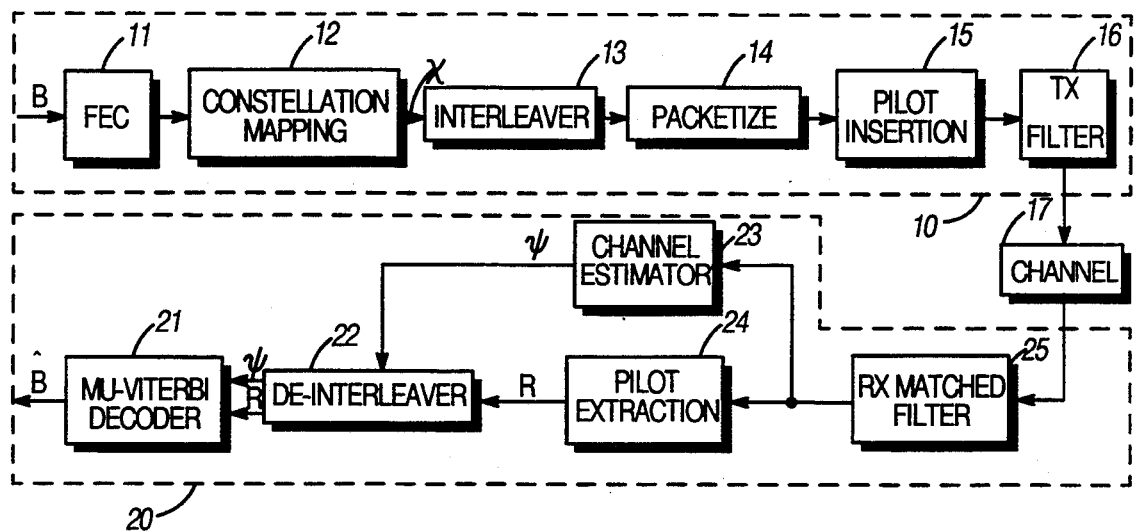
FIG. 1 comprises a block diagram of a transmitter and receiver in accordance with the invention.

FIG. 1 is a block diagram of a multi-user (MU) transmitter (10) using embedded pilots. Included within the transmitter (10) are provisions for forward error correction (FEC) (11), constellation mapping (12), interleaving (13), packetizing (14), pilot insertion (15), and transmit (TX) filtering (16).

A frame of bits, B, (typically 40 ms of data) is input to the FEC (11) where the bits (B) are convolutionally coded (e.g., rate=½, K=3). The output of the FEC (11) is then modulated using a given constellation mapping (12) (e.g., QAM or QPSK). The output (X) of constellation mapping (12) is then interleaved and packetized into small data bursts (less than 2 ms) in an interleaver (13) and packetizer (14). CD-pilots are inserted into the small data bursts in a pilot insertion stage (15). The signal is then filtered (16) before transmission over a channel (17) to a receiver (20).

At the receiver (20) after filtering (25) the pilots are extracted (24) and a channel vector, $\Psi$, is estimated (23). The data, R, after the pilot is removed (24) is de-interleaved (22) before decoding in the multi-user (MU) Virterbi decoder (21).

Decoding within the MU Virterbi decoder (21), in accordance with the invention, is based upon the channel vector, $\Psi$, and the number of interferers. In general, the log-likelihood function is determined in a Channel Response means (50) of the MU Virterbi decoder (21) and can be expressed as follows:

$$LR = \sum_{i=1}^{L} -1/(2\sigma_n^2) \left( |r_i - \sum_{j=1}^{M} \psi_j x^j|^2 \right)$$

From the log-likelihood function it can be observed that the variance ($\sigma_n^2$) of the receiver noise is constant and the channel vector must be known. As such, the maximum likelihood decoder (21) uses the mean square criterion over all possible reference signals. Here, the reference signals are the sum of the desired as well as the interferers perturbed by the known channel vector. For each possible output the Euclidean branch metric, $b_k(j)$, is precalculated in the metric calculator (51) using the equation as follows:

for all $j(1, 2, \ldots m^M$, $bk(j) = |r_k - u_k(j)|^2$ where $u_k(j) = \Psi_1 x_k^1 + \ldots + \Psi_M x_k^M$ and $x_k^i$ is in the set $\{1, 2, \ldots m\}$ where m is the number of points in the constellation.

Figure 2:
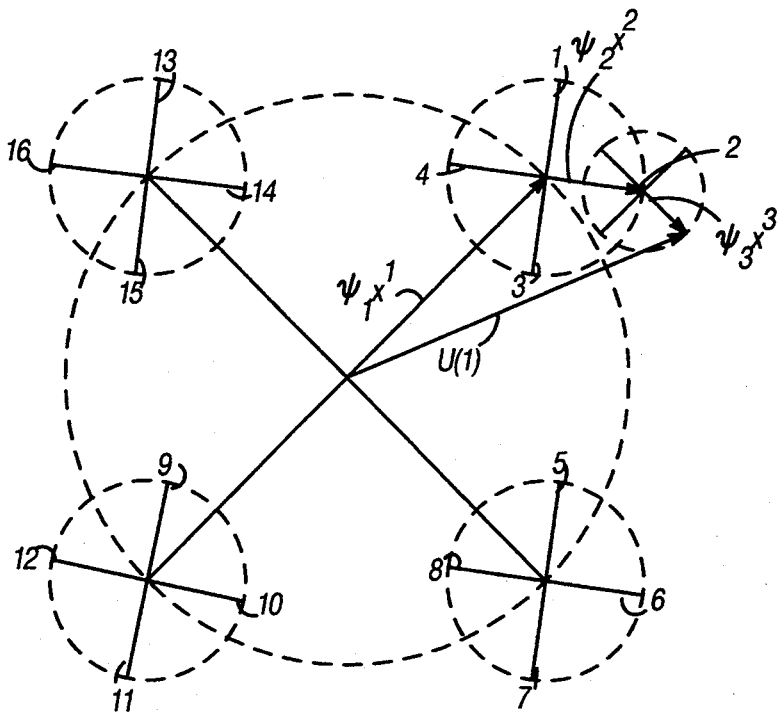
FIG. 2 graphically depicts a summation of two interfering signals on a channel in accordance with the invention.
Figure 3:
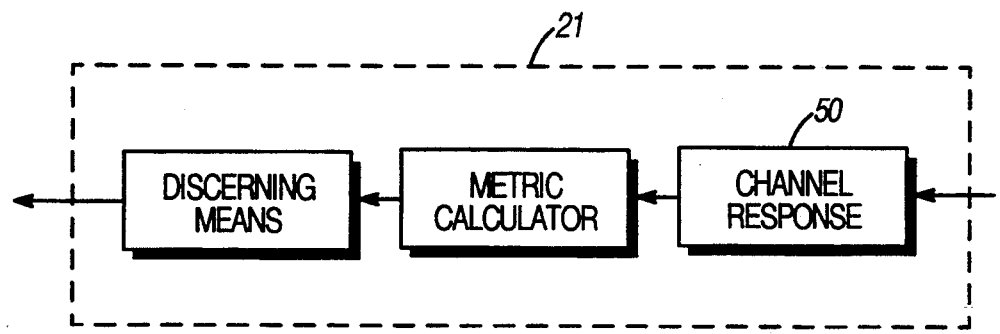
FIG. 3 comprises a more detailed block diagram of the MU-Viterbi Decoder of FIG. 1.
Figure 4:
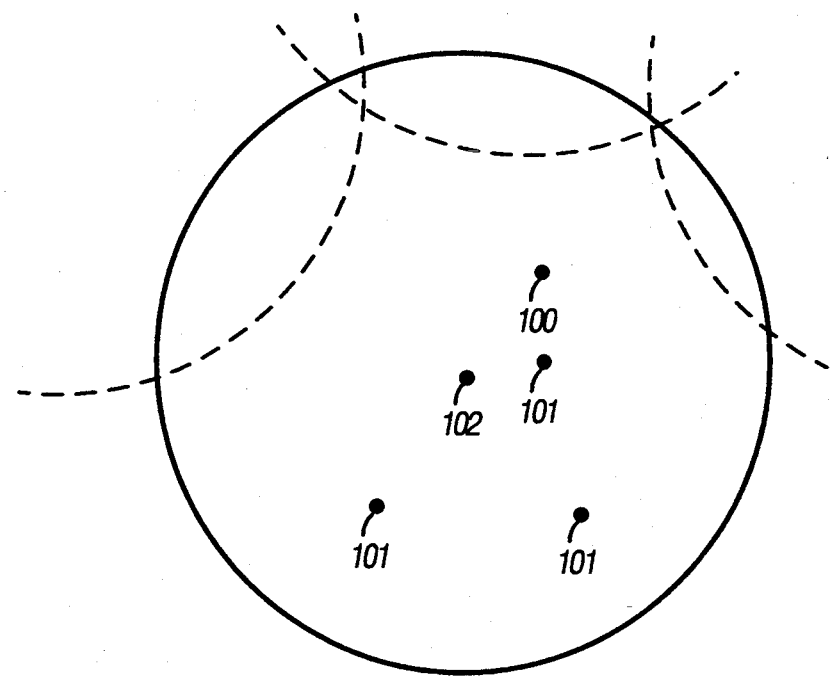
FIG. 4 illustrates a prior art cell of a cellular system containing a plurality of users.

As an example, for QPSK modulation and two users (M=2) there are 16 possible hypothetical received signals (hypothesis) to choose from. FIG. 2 is a graphical representation of 16 possible hypothesis (labeled 1-16) derived from the superposition of one QPSK constellation upon another QPSK constellation.

For each symbol received within the receiver (20) the branch metric, $b_m(j)$, is calculated in metric calculator 51 for each of the 16 hypothesis (FIG. 2) using trellis decoding or non-trellis decoding. The hypothesis with the smallest metric is chosen as the most appropriate solution to discern the signal, in discerning means 52.

Where trellis decoding is used the 16 branch metrics are pre-calculated. The pre-calculated branch metrics are then used within the trellis structure over successive symbols to determine the most likely distance through the trellis under a trellis decoding algorithm (e.g., pgs. 333-337 of *Digital Communications Fundamentals and Applications* by Bernard Sklar, Prentice Hall, 1988).

A single hypothesis for the case of QPSK modulation and three interferers (M=3) is discerned in discerning means 52 as shown in FIG. 2. In the case of three interferers the number of hypothesis is equal to the number of points in the constellation ($4^3$). In the case of three interferers the number of branch metrics rises to 64.

We claim:

1. A method of discerning a signal of a desired user on a channel having the desired user and a plurality of interfering users, each, upon occasion, transmitting an identifiable, known mutually orthogonal pilot symbol, such method comprising the steps of: determining a channel response of the desired user and at least one of the plurality of the interfering users based upon transmitted identifiable, known mutually orthogonal pilot symbols of the desired user and at least one of the plurality of interfering users; calculating a metric based upon the channel responses of the desired user and at least one of the plurality of interfering users; and, discerning the signal of the desired user based, at least in part, upon the metric.

2. The method of claim 1 wherein the step of calculating a metric further includes a step of calculating a metric for each symbol of a symbol constellation of the desired user and at least one of the plurality of interfering users.

3. The method as in claim 2 further including a step of tracing a trellis path for each symbol of the symbol constellation of the desired user and at least one of the plurality of interfering users.

4. The method as in claim 3 further including a step of accumulating a cumulative metric for each path of a plurality of trellis paths.

5. The method as in claim 4 wherein the step of discerning the signal of the desired user further includes a step of selecting the cumulative metric having the smallest relative value as the trellis path representing the desired signal.

6. The method as in claim 1 further including a step of defining the metric as a Euclidean metric.

7. A method of discerning a signal of a desired user on a channel having the desired user and a plurality of interfering users, each, upon occasion, transmitting an identifiable, known mutually, orthogonal pilot symbol, such method comprising the steps of: determining a channel response of the desired user and at least one of the plurality of interfering users based upon the transmitted identifiable, known mutually orthogonal pilot symbol of the desired user and at least one of the plurality of interfering users; calculating a metric equal to the squared difference between a received signal and a sum of the products of transmitted signals and channel responses for the desired user and at least one of the plurality of interfering users; and, discerning the signal of the desired user based, at least in part, upon a minimum metric.

8. The method of claim 7 wherein the step of calculating a metric further includes calculating a metric for each symbol of a symbol constellation of the desired user and at least one of the plurality of interfering users.

9. The method as in claim 8 further including the step of tracing a trellis path for each symbol of the symbol constellation of the desired user and at least one of the plurality of interfering users.

10. The method as in claim 9 further including a step of accumulating a cumulative metric for each path of a plurality of trellis paths.

11. The method as in claim 10 wherein the step of discerning the signal of the desired user further includes a step of selecting the cumulative metric having the smallest relative value as the trellis path representing the desired signal.

12. The method as in claim 7 further including a step of defining the metric as a Euclidean metric.

13. An apparatus for discerning a signal of a desired user on a channel having the desired user and a plurality of interfering users, each, upon occasion, transmitting an identifiable, known mutually orthogonal pilot symbol, such apparatus comprising: means for determining a channel response of the desired user and at least one of the plurality of interfering users based upon the transmitted identifiable, known mutually orthogonal pilot symbols of the desired user and at least one of the plurality of interfering users; means for calculating a metric equal to the squared difference between a received signal and a sum of the products of transmitted signals and channel responses for the desired user and at least one of the plurality of interfering users; and, means for discerning the signal of the desired user based, at least in part, upon a minimum metric.

14. The apparatus as in claim 13 wherein the means for identifying the signal of the desired user further comprises means for determining the desired signal by reference to a trellis path.

* * * * *